(12) United States Patent
Kolev et al.

(10) Patent No.: US 7,922,870 B2
(45) Date of Patent: Apr. 12, 2011

(54) METHOD AND SYSTEM FOR THE PYROLYSIS OF WHOLE TIRES

(76) Inventors: Dimitar Nikolaev Kolev, Sofia (BG); Radka Borisova Ljutzkanova, Sofia (BG); Stefan Todorov Abadjiev, Sofia (BG)

( * ) Notice: Subject to any disclaimer, the term of this patent is extended or adjusted under 35 U.S.C. 154(b) by 517 days.

(21) Appl. No.: 11/913,459

(22) PCT Filed: May 3, 2006

(86) PCT No.: PCT/BG2006/000010
§ 371 (c)(1),
(2), (4) Date: Nov. 2, 2007

(87) PCT Pub. No.: WO2006/119594
PCT Pub. Date: Nov. 16, 2006

(65) Prior Publication Data
US 2008/0202913 A1    Aug. 28, 2008

(30) Foreign Application Priority Data
May 9, 2005    (BG) .................................. 109150

(51) Int. Cl.
*C10B 33/00* (2006.01)
*C10B 53/07* (2006.01)

(52) U.S. Cl. .............. 201/3; 201/25; 202/118; 48/127.7
(58) Field of Classification Search ................ 201/3, 25; 202/118; 48/127.7; 110/341
See application file for complete search history.

(56) References Cited

U.S. PATENT DOCUMENTS

| 4,846,082 A * | 7/1989 | Marangoni ................... 110/234 |
| 4,983,278 A * | 1/1991 | Cha et al. ..................... 208/407 |
| 5,157,176 A * | 10/1992 | Munger ............................ 585/7 |
| 7,004,087 B2 * | 2/2006 | Song ............................. 110/235 |
| 7,347,982 B2 * | 3/2008 | Denison ..................... 423/449.1 |
| 7,500,997 B2 * | 3/2009 | Norbeck et al. ............. 48/127.7 |
| 2009/0250332 A1 * | 10/2009 | Wu et al. ......................... 202/94 |

FOREIGN PATENT DOCUMENTS

| GB | 812822 | 5/1959 |
| GB | 2303859 A | 5/1997 |

* cited by examiner

*Primary Examiner* — N. Bhat
(74) *Attorney, Agent, or Firm* — Brooks Kushman P.C.

(57) ABSTRACT

A method and apparatus for waste tyres pyrolysis wherein whole tyres are directly heated in a tunnel type furnace with flue gases from the combustion of pyrolysis gases. The process produces thermal energy, carbon black and mineral oil. The cooled flue gases are purified from sulfur oxides before released into the atmosphere.

6 Claims, 2 Drawing Sheets

METHOD AND SYSTEM FOR THE PYROLYSIS OF WHOLE TIRES

TECHNICAL FIELD

The present invention relates to a method for waste tires pyrolysis and installation for its implementation and can be applied in the reprocessing of tires for the production of thermal energy, carbon black and mineral oil. The obtained carbon black may be used in the production of rubber articles, and the mineral oil—as fuel or softener in the production of such articles.

BACKGROUND ART

Document GB 2 303 859 makes known a method for pyrolysis of tires, processed in one piece or cut in big pieces, where the tires are heated indirectly to a temperature from 200 to 1000° C., preferably from 300 to 800° C., in a pyroliser, which is a horizontal channel, the tires being fed into it loaded in mobile trolleys. When heated, the tires pyrolize and pyrolysis gas, mineral oils' vapors exported with the pyrolysis gas, and solid carbon are obtained. The process takes place in three stages: heating of the tires, the process of pyrolysis itself, and cooling the obtained solid carbon. The indirect heating is realized through hot flue gases obtained from the burning of a part of the pyrolysis gas. The received pyrolysis gases are being cleaned from sulfur oxides.

The GB 2 303 859 document also shows an installation for pyrolysis of tires which includes a pyroliser, shaped as a horizontal furnace channel, in which trolleys with tires are placed. The channel is heated from outside with hot flue gases. The pyroliser is separated by mobile screens into a heating and pyrolysis zone and a zone for the cooling of the solid carbon. The installation includes burners for burning the pyrolysis gas, a unit for cleaning of the flue gases from sulfur oxides, a condensation unit for separation of mineral oils, as well as a magnet system for removing of the wires from the obtained carbon products.

The known method and installation use indirect heating of tires which is effected through the pyrolizer's wall, and for that reason the exhaust gases are released with high temperature, which is the reason of an increase of energy losses. Besides, the heating of the pyroliser's wall to a high temperature causes cracking of the hydrocarbons obtained from the pyrolysis, which leads to the decrease of their yield and the lowering of the quality of the obtained carbon product.

DISCLOSURE OF INVENTION

The technical problem, which is set for solving consists in increasing the energy efficiency in reprocessing waste tires through pyrolysis, while the quality of the obtained solid carbon residue so, that it would be suitable for use as carbon black in the rubber industry.

The invention is solved through a method for pyrolysis of whole tires, where they are heated to temperature of 400-950° C. and pyrolize. Pyrolysis gas, mineral oils' vapors, exported with the pyrolysis gas and solid carbon are obtained in result of the process. The mineral oils are separated at the cooling of the pyrolysis gas. The heat, necessary for the pyrolysis is supplied by flue gases obtained at pyrolysis gas burning. The sulfur oxides obtained in the process are separated.

According to the invention a characteristic feature of the method is that the tires are heated directly by flue gases in crossed counterflow to temperature of 600-950° C., predominantly 650-750° C., the flue gases being enriched with steam with concentration 15-40%, preferably 18-30%. In the course pyrolyses gases are obtained, which are cooled down to temperature of 150-300° C., and after the cooling are divided into two streams. One of the streams is cooled additionally to temperature of 80-100° C., part of the mineral oils contained in that stream condensing as a result, and after that it is mixed again with the other non-cooled pyrolysis gases stream. The obtained gases are being burnt, only part of the hot flue gases being used for the pyrolysis, and the gases after the cooling being cleaned from sulfur oxides and released into the atmosphere. The obtained solid carbon represents carbon black suitable for use in rubber industry.

According to the invention the installation for the realization of the method includes a horizontal pyroliser, shaped as a furnace channel in which trolleys loaded with tires are moving, the pyroliser itself being divided by mobile screens into a zone for heating and pyrolysis and a zone for cooling of the carbon black. Burners for burning the pyrolysis gas, a unit for cleaning of the flue gases from sulfur oxides and a condenser for separating the mineral oils are also provided.

According to the invention a characteristic feature of the installation is that the pyroliser is thermally insulated, the trolleys have a vertical partition, they are placed on rails and are sealed to the pyroliser walls. Channels for supplying and discharging gases and channels enabling the gas cross flow through the pyroliser are located on both sides of it. All channels are connected to the pyroliser through holes, evenly distributed in its side walls. Compact walls with length not less than the length of a single trolley are framed in these walls. A zone for heating and pyrolysis, a zone for carbon black cooling, as well as a zone for pre-heating, a zone for blowing with air and zone for carbon black separation are formed through the compact walls and the vertical portion of the trolleys. The channel for discharging of cooled flue gases is connected to a stack. The channel supplying the flue gases in the pre-heating zone is connected to the channel discharging the flue gases from the zone for cooling of the carbon black. The channel supplying flue gases into the zone for cooling of the carbon black is connected to the stack through a gas duct. A water-supply pipeline ending with a sprayer is also connected to this gas duct. The pyrolysis gases channel is connected to the combustion chamber with a burner through a gas duct on which a pyrolysis gases valve is installed. The condensation unit for separating the mineral oils, consisting of a direct cooler and a heat exchanger is connected at both sides of the valve. The combustion chamber with burner is connected directly to a boiler, which on its turn is connected to the channel for supplying of hot gases into the pyroliser as well as to a contact economizer. This economizer is connected also to the unit for cleaning of the flue gases from sulfur oxides, which on its turn is connected to the stack. The installation includes also an air humidifier, which is connected to the first fan, to the combustion chamber with burner, and to the contact economizer. The zone for blowing with air is connected to a second air fan through the air supply channel. This zone is also connected to the air outlet channel, the latter being connected to the stack. As per one preferred mode for carrying out the installation the trolleys have profiles connected with the floor and with the vertical partition. The latter is shaped to follow the pyroliser cross-section and is sealed to it by plates, connected with "hinges" and tightened by tie-bars. Each trolley has wheels. The horizontal axle of the diameters of the tires loaded in the trolley is predominantly perpendicular to the pyroliser axle. The tires are supported by struts, preferably made of expanded metal sheets and are stabilized by bearers.

The advantages of the tire pyrolysis method and installation are that the tires heating is performed directly by gases, which leads to reducing energy expenses compared to heating through a wall. Adding steam to the gas mixture and decreasing the temperature in the pyroliser reduce manifold the harmful impact of cracking on the quantity and quality of the products obtained from the pyrolysis, and the steam is recovered within this installation. The installation is especially efficient for pyrolysis of whole tires, as facilities that do not allow crushing of the tires are provided for the trolleys that are used for supplying the tires into the pyroliser. When the tires soften as a result of the heating, their heating surface does not decrease.

BRIEF DESCRIPTION OF DRAWINGS

The invention is illustrated by the attached drawings, where.

BEST MODE FOR CARRYING OUT THE INVENTION

Figure 1:
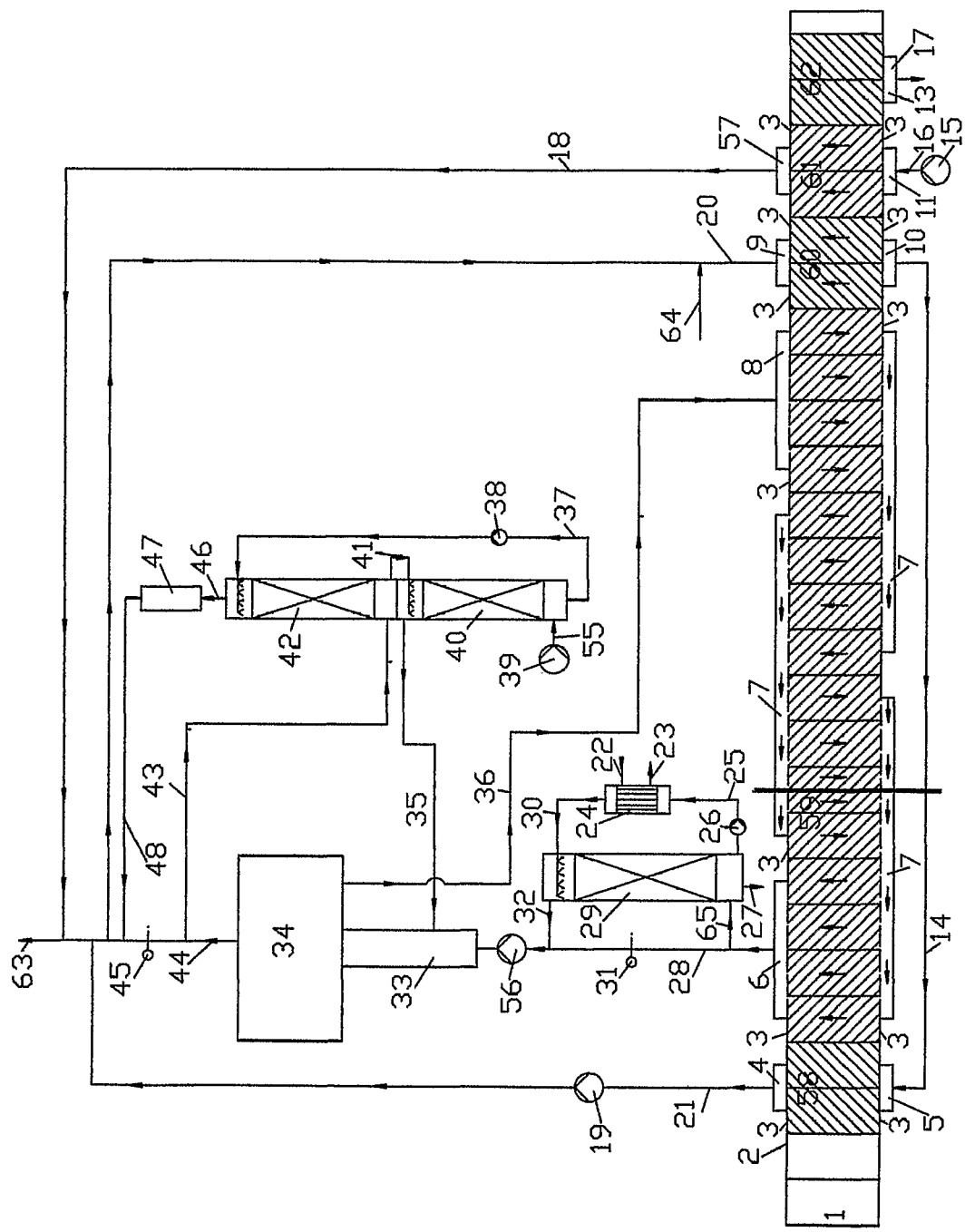
FIG. 1 shows a flow diagram of the installation as per a mode for carrying out the invention.
Figure 2:
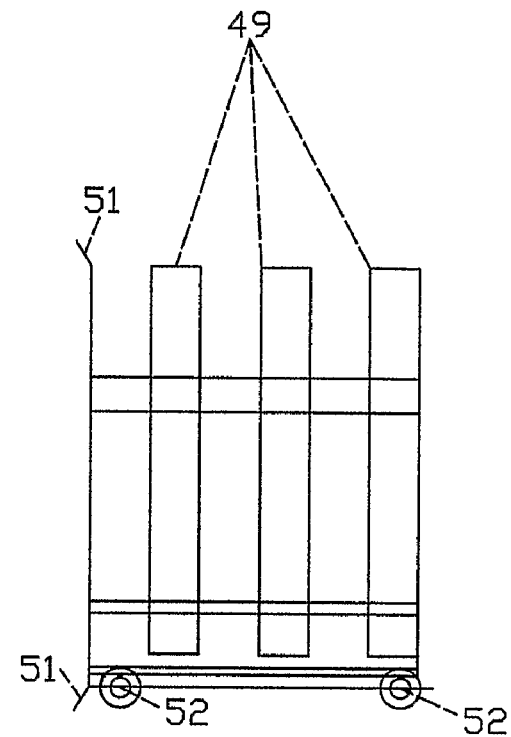
FIG. 2 shows a trolley front view.
Figure 3:
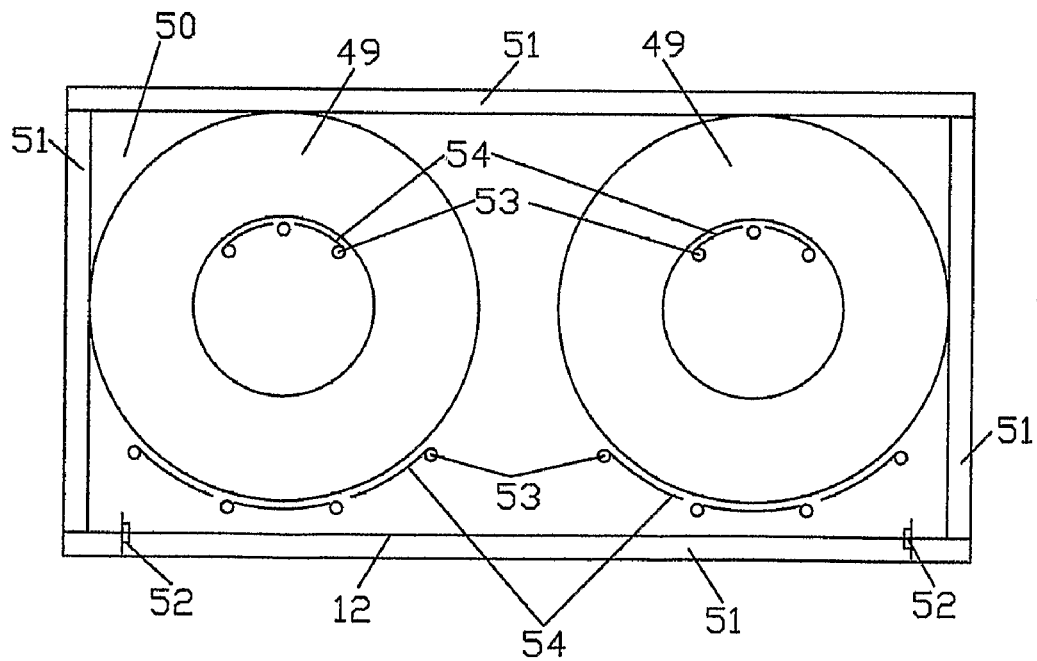
FIG. 3 shows a trolley side view.

An example of the tire pyrolysis installation according to the invention, as shown on FIG. 1 includes a pyroliser 2, which represents a thermally insulated horizontal furnace channel. The trolleys 1 run on rails in it. The installation includes also a combustion chamber with a burner 33, a boiler 34, a contact economizer 42, an air humidifier 40, a direct cooler 29, a heat exchanger 24, fans 19, 39 and 56, and pumps 26 and 38. The trolleys 1 are made of profiles forming a frame, as it is shown on FIG. 2 and FIG. 3. A floor 12, made of compact metal sheets, and a vertical partition 50, located at the rear part of the trolley 1, are connected with this frame. This partition is shaped to follow the pyroliser 2 cross-section, and is sealed to the pyroliser walls by plates 51, tilted opposite to the trolley 1 movement direction. The plates 51 are connected by "hinges" with the trolley 1 and are tightened by tie-bars. Each trolley 1 has wheels 52. The trolleys are loaded with tires 49, the horizontal axle of the diameters of the tires 49 being perpendicular to the pyroliser 2 axle. The tires 49 are supported by struts 54 made of expanded metal sheets and are stabilized by bearers 53, made of pipes. The channels 4, 5, 6, 8, 9, 10, 11 and 57 for supplying and discharging gases to and from the pyroliser, as well as the channels 7 for realizing cross movement of the gas are located at the side of the pyroliser. The height of channels 4, 5, 6, 7, 8, 9, 10, 11 and 57 is the same as the height of the pyroliser 2. They are connected to the pyroliser by evenly distributed holes, located on its walls that are common with those channels. Between the adjacent channels 7, as well as between the adjacent channels 6 and 7, and 7 and 8 the walls of the pyroliser 2 are formed as compact walls 3. The distance between the above mentioned adjacent channels equals to 1.05 lengths of the trolley. Partitioning zones are formed by the opposite compact walls 3 and the vertical portion 50 to separate the pyroliser 2 into five zones: a pre-heating zone 58, a heating and pyrolysis zone 59, a carbon black cooling zone 60, a zone for blowing with air 61 and a zone for separating the carbon black 62. One compact wall 3 and one vertical partition 50 secure the change of the gas flow through the tires 49. The zone for carbon black separation 62 is connected to a bunker 13. The bunker 13 is connected also with the line 17 for discharging of the carbon black from the installation. The channel 4 serves for discharging of cooled flue gases and is connected through the second gas duct 21 for cooled flue gases to the first gas duct for cooled flue gases 44, connected to the stack 63. A flue gases valve 45 is mounted on the first gas duct for cooled flue gases 44. The channel 5 serves for supplying the flue gases into the zone for pre-heating of the tires 58 and is connected to the channel 10 for discharging of flue gases from the zone for carbon black cooling 60 through the third gas duct for cooled flue gases 14. The channel 9 serves for supplying flue gases into the carbon black cooling zone 60 and is connected through a fourth gas duct 20 to the first gas duct for cooled flue gases 44, before the point where it is connected to the second gas duct for cooled flue gases 21. A water-supply pipeline 64 for supplying water, which ends with a sprayer, is connected to the end of the fourth gas duct 20. The fan 19 is connected to the second gas duct for cooled flue gases 21. The pyrolysis gases channel 6 is connected through the first pyrolysis gases duct 28 to the combustion chamber with a burner 33. The pyrolysis gases valve 31 and the pyrolysis gases fan 56 are connected to the gas duct 28 before the combustion chamber with burner 33. The combustion chamber with burner 33 is connected directly to the boiler 34. The latter is connected through a gas duct for hot flue gases 36 to the channel 8, which serves for supplying hot flue gases into the pyroliser 2. Gas ducts 65 and 32 serving, respectively, for supplying and discharging pyrolysis gas to the direct cooler 29 are connected to the both sides of the pyrolysis gases valve 31, situated on the first pyrolysis gases duct 28. The cooler 29 is connected also to a pipeline for discharging of oil condensate 27. Pipeline 27 is connected also to pipelines 25 and 30 for supplying and discharging hot and cool oil condensate respectively to the heat exchanger 24. A pump 26 is installed at the hot oil condensate supply pipeline 25. Pipelines 22 and 23 for supplying cold water and discharging hot water respectively are connected to the heat exchanger 24, too. The air humidifier 40 is connected to the first air supply fan 39 through the first air duct 55. It is connected also to the combustion chamber with burner 33 through the second air duct 35, and to the contact economizer 42—through a pipeline for cooled circulation water 37, on which a water pump 38 is installed. It is connected to this apparatus also through the hot water pipeline 41. The contact economizer 42 is connected also to the first smoke stack for discharging flue gases 44 through the fifth flue gases pipeline 43, before the flue gases valve 45. The contact economizer 42 is connected also to the unit for cleaning of the flue gases from sulfur oxides 47 through the sixth flue stack 46. The latter on its turn is connected through the seventh flue stack 48 to the first flue stack 44 for discharging flue gases to the stack 63, after the flue gases valve 45, but before the place where that flue stack is connected to the fourth gas duct 20 for cooled flue gases. The zone for blowing with air 61 is connected through the air supply channel 11 to a second air duct 16, and through it—to a second air fan 15. It is connected also to the discharged air channel 57, which is connected to the third air duct 18. The latter is connected to the first flue stack for discharging flue gases 44, after its connection with the second gas duct 21 for cooled flue gases.

INDUSTRIAL APPLICABILITY

The above described installation works in the following way:

The tires 49, washed and dried in advance, are loaded on the trolleys 1, onto the struts 54. The loaded trolleys are fed into the pyroliser 2, and are being sealed to its walls through the plates 51. Flue gas is fed into the pyroliser 2 in counter-flow with the trolleys 1 loaded with the tires 49, the temperature at the entry section of the pyroliser 2 being kept at 650° C. The flue gas contains 25% steam. The gases are taken out from the boiler 34, where they have been cooled in advance and along the hot flue gases duct 36, through the perforated wall of the channel 8 for supplying hot gases into the pyroliser 2 are fed in crossed counterflow to the tires 49. Their progression follows this pattern: through the tires 49 to the first pass of the gas channel 7—realizing the cross motion of the gas. From that channel, through the tires 49 to the opposite channel 7 again realizing the cross motion of the gas, and again to the last channel 7, successively realizing the cross motion of the gas. From it and through the tires 49 the gases get into channel 6 for pyrolysis gases. When the gases move through the tires, they cool down to 170° C. With that temperature, passing through the pyrolysis gases channel 6 and through the first pyrolysis gases duct 28, the obtained pyrolysis gases leave the pyroliser 2. From there a part of the gases are diverted to the direct cooler 29 by the pyrolysis gases valve 31, where they are cooled down to 85° C. by circulating cooled pyrolysis oil. A part of the oil carried by the gases condense at the cooling and is separated from the installation through the pipeline 27 for discharging oil condensate. The treated gases are mixed with the untreated pyrolysis gases and are supplied into the combustion chamber with burner 33 through the pyrolysis gases fan 56. The pyrolysis oil that has condensed in the direct cooler 29 is supplied through the oil condensate pump 26 to the heat exchanger 24, where it is cooled indirectly with water to 87° C. The water that has been used for cooling is supplied to the heat exchanger 24 along the pipeline 22 for cold water supply and with temperature of 80° C. is discharged from it along the pipeline 23. The utilized heat is used for domestic and district heating purposes.

The pyrolysis gases, mixed with a flow of pre-heated air, containing 24% steam, supplied through the second air duct 35 from the humidifier 40 are being ignited and burnt in the combustion chamber with burner 33. The burnt flue gases are supplied into the boiler 34, where they discharge their heat for steam production. A part of the burnt flue gases are separated in the boiler 34 before their final cooling and with temperature 650° C. enter the pyroliser 2 through the hot flue gases duct 36. The rest of them leave boiler 34 with temperature 110° C. and with the aid of the flue gases valve 45 are diverted along the flue gases pipeline 43 to enter the contact economizer 42. There they are washed with cooled circulation water, heating it up to 67° C. The flue gases cooled in the contact economizer enter the unit for cleaning of the flue gases from sulfur oxides 47 through the sixth flue stack 46, and after that, running through the seventh flue stack 48 are discharged into the atmosphere through stack 63.

The water heated in the contact economizer is supplied into the air humidifier, where it heats in counterflow the air, supplied from the first fan (a) for air supply 39, heating the air to temperature 66.5° C. and humidifying it to 25%. With that temperature and moisture content the heated air is supplied to the burner of the combustion chamber with burner 33 through the second air duct 35.

The tires 49, prepared to be subject to pyrolysis, are being loaded in the trolleys 1 and enter on rails the first separating zone. From there they pass through the zone for pre-heating of tires 58, where they are heated by flue gases to a temperature of 60° C. Having been cooled here to a temperature of 110° C., the flue gases are sent to the stack 63 through the second gas duct for cooled flue gases 21. The zone for tires pre-heating 58 is separated from the zone for heating and pyrolysis 59 by second separating zone between the opposite screens 3. When treated with hot flue gases, which in the course of the process turn into pyrolysis gas, the tires pyrolize. The vapors of liquid pyrolysis products and pyrolysis gases obtained in that process mix with the flue gases and are discharged as pyrolysis gases through the pyrolysis gases channel 6. The wire from the tires as well as the carbon black and the other fillers added at the production of the tires and contained in them remain on the trolleys 1. Being exposed to the high temperature of the supplied flue gases and to their high moisture content, the carbon black is refined and become suitable for use in the rubber industry—for secondary use in the production of rubber articles. When the trolleys 1 pass through the pyroliser 2, each corresponding trolley 1 enters the next separation zone 3. From there it passes through zone 60 for cooling of the trolleys and carbon black and cools down to a temperature of 110° C. by the flue gases, supplied through the fourth gas duct 20. Finely dispersed water is injected to improve the cooling of the flue gases through the water pipeline 64, ending with sprayer. Cooled down to a temperature of 95° C. along the gas duct 14, those gases enter the pre-heating of tires zone 58.

The fourth separating zone 3 follows the trolleys 1 pass into zone 61 to be blown with air, supplied by the second air fan 15. The heated air flow is supplied to the stack 63 through the third air duct 18. The cooled trolleys 1 pass through the fifth separation zone 3. From there they enter zone 62 for separating the carbon black. There the carbon black is removed from the trolleys and is fed to bunker 13, from where it is discharged from the pyroliser through line 17 for separating the wire and consequent grinding. The trolleys 1 are reloaded with washed and dried tires 49 and are supplied again into the pyroliser 2.

At the processing of 2.2 tons of tires about 770 kg of carbon black and about 9000 kWh heat in the form of steam are obtained. When extracting part of the pyrolysis oil as end product the quantity of the obtained heat is being reduced correspondingly.

The invention claimed is:
1. A method of pyrolyzing tyres, comprising the steps of:
a) introducing tyres to a pyrolyzer;
b) heating the tyres to a temperature ranging from 400° C. to 950° C. directly with a flue gas in cross counterflow;
c) pyrolyzing by heating the tyres having a composition including mineral oil and carbon black;
d) producing pyrolysis gas containing mineral oil, vapors, gaseous pyrolysis products and flue gas;
e) cooling the pyrolysis gas to a temperature ranging from 150° C. to 300° C.;
f) dividing the pyrolysis gas into a first pyrolysis gas flow and a second pyrolysis gas flow;
g) cooling directly the first pyrolysis gas flow additionally to a temperature ranging from 80° C. to 100° C., condensing the main part of mineral oil contained in the pyrolysis gas;
h) separating the condensed mineral oil;
i) obtaining a pyrolysis gas mixture by mixing the first and the second pyrolysis gas flows;
j) burning the pyrolysis gas mixture with air containing water vapor forming a flue gas with a steam concentration ranging from 15 vol % to 40 vol %;
k) cooling the flue gas and dividing it into a first flue gas flow and a second flue gas flow;
l) providing the first flue gas flow to the pyrolyzer at a temperature ranging from 600° C. to 950° C. and a humidity ranging from 15 vol % to 40 vol % heating the tyres;
m) cooling additionally the second flue gas flow;
n) purifying the second flue gas flow from sulfur oxides;
o) releasing the second flue gas flow into the atmosphere;

p) cooling the carbon black included in the tyres;

q) taking the carbon black out of the system as a product.

2. The method of pyrolyzing tyres of claim 1, wherein the heating of the tyres with the first flue gas flow occurs at a temperature ranging from 650° C. to 750° C.

3. The method of pyrolyzing tyres of claim 1, wherein the heating of the tyres with the first flue gas flow enriched with steam occurs at a steam concentration ranging from 18 vol % to 30 vol %.

4. A system for pyrolysis of tyres, the system producing pyrolysis gas, carbon black, and mineral oil as end products, the system comprising:

a horizontal furnace having a channel-shaped pyrolyzer including opposed spaced walls and including opposed and spaced apart rails situated along a longitudinal axis within the pyrolyzer, including a plurality of moving trolleys loaded with tyres and having vertical partitions separating the pyrolyzer into zones situated one after another starting from a tyres inlet, a zone for preheating communicating with a zone for heating and pyrolysis, which communicates with a zone for cooling carbon black, which communicates with a zone for blowing with air and which is proximate to a zone for separating carbon black, at least one trolley being situated on rails and being sealed to the walls of the pyrolyzer, the pyrolyzer communicating by evenly distributed apertures with a plurality of horizontal channels situated on both sides of the pyrolyzer, the pyrolyzer walls having regions without apertures which cooperate with the vertical partitions to define cavities for dividing the pyrolyzer zones and dividing the pyrolyzer from the atmosphere, the cavity length being more than the length of the trolley;

a first horizontal channel being connected to the apertures on the one side of the zone for pre-heating;

a second horizontal channel being connected to the apertures on the other side of the zone for pre-heating;

a third horizontal channel being connected to the apertures on the one side of an initial part of the zone for heating and pyrolysis;

a fifth horizontal channel being connected to the apertures on the one side of an end part of the zone for heating and pyrolysis;

a plurality of fourth horizontal channels being connected to the rest of the apertures on both sides of the zone for heating and pyrolysis, on one side being connected to a portion of the downstream apertures on the same side of the zone for heating and pyrolysis, and on the other side being connected with the pyrolyzer to allow cross counterflow of gas;

a sixth horizontal channel being connected to the apertures on the one side of the zone for cooling carbon black;

a seventh horizontal channel being connected to the apertures on the other side of the zone for cooling carbon black;

an eighth horizontal channel being connected to the apertures on the one side of the zone for blowing with air;

a ninth horizontal channel being connected to the apertures on the other side of the zone for blowing with air;

the pyrolyzer and the first to eighth horizontal channels being thermally insulated, the second horizontal channel being connected by a first gas duct downstream of the seventh horizontal channel;

the ninth horizontal channel being connected by a second gas duct downstream of a fan;

the eighth horizontal channel being connected by a third gas duct upstream of a stack;

a combustion chamber including a burner situated in the chamber burning pyrolysis gas, the burner being connected by a fourth gas duct downstream of a pyrolysis gas fan, a pyrolysis gas valve and the third horizontal channel of the pyrolyzer;

a boiler for utilization of waste heat being connected downstream of the combustion chamber, communicating with the fifth horizontal channel by a fifth gas duct, and being connected by a sixth gas duct through a valve with a stack;

a humidification system including a contact economizer with a water distributor and an air humidifier with a water distributor, the contact economizer being connected by sixth and seventh gas ducts downstream of the boiler before the valve of the sixth gas duct, the water distributor of the contact economizer communicating with and downstream of the bottom of the air humidifier by a first water pipe through a pump, the bottom of the contact economizer being connected upstream of the water distributor of the air humidifier by a second water pipe, the air humidifier being connected upstream of the burner by an eighth gas duct;

an air fan for supplying atmospheric air, the fan being connected upstream of the humidifier;

a cleaning unit when cleaning sulfur oxides from the flue gas, the cleaning unit being connected downstream of the contact economizer and being connected by a ninth gas duct to the sixth gas duct after the flue gas valve;

a condensation unit separating mineral oil from the pyrolysis gas, the condensation unit including a direct cooler and a heat exchanger, the direct cooler communicating with and downstream of the third horizontal channel, the direct cooler being connected to the forth gas duct before and after the pyrolysis gas valve and also connected by pipes for hot and cold mineral oil with the heat exchanger, the heat exchanger being connected with pipes for cooling and heated water; and the first horizontal channel being connected by a tenth gas duct through a fan to the sixth gas duct after its valve before the connection of the third gas duct, the sixth horizontal channel being connected to the sixth gas duct by an eleventh gas duct before the connection of the tenth gas duct.

5. The system of claim 4, wherein the trolleys have floors with profiles connected thereto, the profiles and vertical partitions are shaped to follow the pyrolyzer cross section, the vertical partition being sealed to the pyrolyzer walls by hingedly connected, tightened plates, each trolley having wheels connected to the floor of the trolley and, the trolley being loaded with tyres such that the planes of the annular openings are substantially perpendicular to the longitudinal pyrolyzer axis, the tyres being supported on struts connected to the trolleys and being stabilized by bearers connected to the struts.

6. The system of claim 5, wherein the struts are made from expanded metal sheets.

* * * * *

UNITED STATES PATENT AND TRADEMARK OFFICE
CERTIFICATE OF CORRECTION

| | | |
|---|---|---|
| PATENT NO. | : 7,922,870 B2 | Page 1 of 1 |
| APPLICATION NO. | : 11/913459 | |
| DATED | : April 12, 2011 | |
| INVENTOR(S) | : Dimitar Nikolaev Kolev et al. | |

It is certified that error appears in the above-identified patent and that said Letters Patent is hereby corrected as shown below:

Column 8, Line 37, Claim 4

Delete "forth" and insert --fourth--

Signed and Sealed this
Sixteenth Day of August, 2011

David J. Kappos
*Director of the United States Patent and Trademark Office*